United States Patent
Matthews

(10) Patent No.: US 8,671,337 B2
(45) Date of Patent: Mar. 11, 2014

(54) METHODS, SYSTEMS AND DEVICES FOR MULTIMEDIA-CONTENT PRESENTATION

(75) Inventor: Kristine Elizabeth Matthews, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1691 days.

(21) Appl. No.: 11/692,143

(22) Filed: Mar. 27, 2007

(65) Prior Publication Data

US 2008/0244683 A1 Oct. 2, 2008

(51) Int. Cl.
*G06F 17/00* (2006.01)

(52) U.S. Cl.
USPC .............. 715/234; 715/201; 715/229

(58) Field of Classification Search
USPC .......................... 715/234, 201, 229
See application file for complete search history.

(56) References Cited

U.S. PATENT DOCUMENTS

| | | | |
|---|---|---|---|
| 5,821,945 A | 10/1998 | Yeo et al. | |
| 6,363,380 B1 | 3/2002 | Dimitrova | |
| 6,408,128 B1 * | 6/2002 | Abecassis | 386/68 |
| 6,580,437 B1 | 6/2003 | Liou et al. | |
| 6,845,485 B1 * | 1/2005 | Shastri et al. | 715/203 |
| 7,080,392 B1 * | 7/2006 | Geshwind | 725/34 |
| 7,333,967 B1 * | 2/2008 | Bringsjord et al. | 706/45 |
| 7,716,232 B2 * | 5/2010 | Glenn | 707/758 |
| 2002/0097983 A1 * | 7/2002 | Wallace et al. | 386/55 |
| 2003/0068161 A1 | 4/2003 | Lasorsa et al. | |
| 2003/0128969 A1 | 7/2003 | Lee | |
| 2003/0131362 A1 | 7/2003 | Jasinschi et al. | |
| 2004/0125121 A1 * | 7/2004 | Pea et al. | 345/716 |
| 2004/0139481 A1 * | 7/2004 | Atlas et al. | 725/135 |

FOREIGN PATENT DOCUMENTS

| | | |
|---|---|---|
| WO | WO 00/39707 A1 | 7/2000 |
| WO | WO 02/08933 A2 | 1/2002 |

OTHER PUBLICATIONS

Turetsky et al., "Screenplay Alignment for Closed-System Speaker Identification and Analysis of Feature Films", Proceedings of 2004 IEEE International Conference on Multimedia and Expo (ICME), p. 1659-1662.*

Klippgen, et al., The Use of Metadata for the Rendering of Personalized Video Delivery, In Managing Multimedia Data: Using Metadata to Integrate and Apply Digital Data, Amit Sheth and Wolfgang Klas (eds.), McGraw Hill, 1998, pp. 287-318.*

* cited by examiner

*Primary Examiner* — Amelia Rutledge
(74) *Attorney, Agent, or Firm* — Kristine Elizabeth Matthews; David C. Ripma

(57) ABSTRACT

Embodiments of the present invention comprise systems, methods and devices for determining by-storyline data from by-episode data.

20 Claims, 6 Drawing Sheets

METHODS, SYSTEMS AND DEVICES FOR MULTIMEDIA-CONTENT PRESENTATION

FIELD OF THE INVENTION

Embodiments of the present invention comprise methods, systems and devices for multimedia-content presentation.

BACKGROUND

Personal video recorders (PVRs), digital video recorders (DVRs) and other recording devices may make it possible to record, or otherwise store, television, or other multimedia, content for time-shifted consumption. Viewers may wish to consume this recorded content in a non-traditional fashion.

SUMMARY

Some embodiments of the present invention comprise methods and systems for decomposing multi-storyline content into multiple, individual storyline content.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention, but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Personal video recorders (PVRs), digital video recorders (DVRs) and other recording devices may make it possible to record, or otherwise store, television, or other multimedia, content for time-shifted consumption. Viewers may wish to consume this recorded content in a non-traditional fashion.

An exemplary scenario in which non-traditional content consumption may be desirable may arise when several episodes of a television production broadcast in serial format have been stored. Exemplary television productions broadcast in serial format may comprise daytime "soap operas," also considered daytime serials, and primetime "soap operas," also considered nighttime serials. Examples of daytime serials may include Days of Our Lives, All My Children, The Young and the Restless and others. Examples of nighttime serials may include Dallas, Dynasty and others. A serial television production may comprise one or more continuously evolving plots, or storylines, and sets of characters. An alternative to consuming the stored episodes on a by-episode basis may be consuming the episodes on a by-storyline basis.

Figure 1:
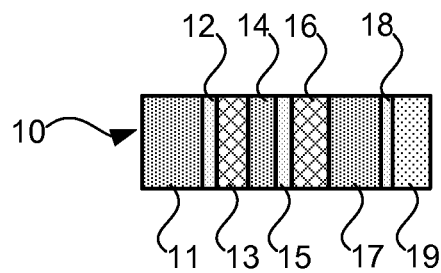
FIG. 1 is a drawing depicting an exemplary multi-storyline segment of multimedia content.

Some embodiments of the present invention comprise methods and systems for presentation of recorded, or otherwise stored, television, or other multimedia, content. These embodiments of the present invention may allow a viewer to consume the multimedia content on a by-storyline basis. These embodiments may be described in relation to FIG. 1.

Figure 2A:
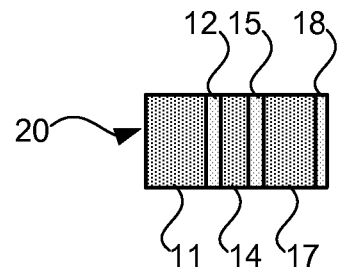
FIG. 2A is a drawing depicting an exemplary individual storyline extracted from a multi-storyline segment of multimedia content.
Figure 2B:
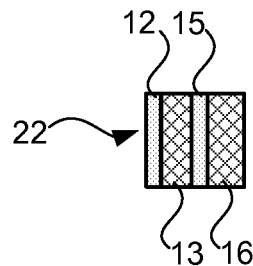
FIG. 2B is a drawing depicting an exemplary individual storyline extracted from a multi-storyline segment of multimedia content.
Figure 2C:
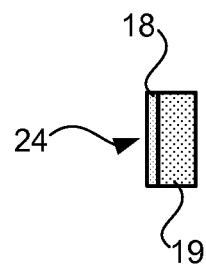
FIG. 2C is a drawing depicting an exemplary individual storyline extracted from a multi-storyline segment of multimedia content.
Figure 3:
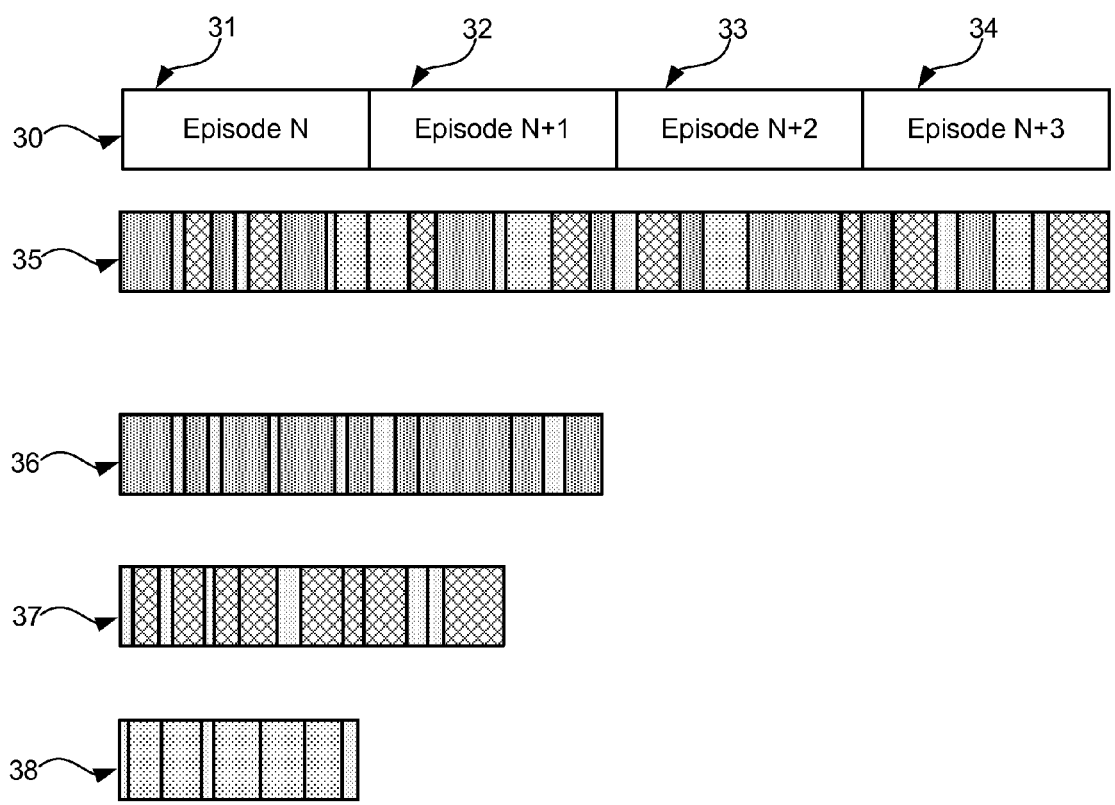
FIG. 3 is a drawing depicting several exemplary episodes of a multi-storyline multimedia content and decomposition of the multi-storyline into multiple, individual storylines.

An episode 10 of a television show may be recorded, and the episode 10 may comprise several segments 11-19, wherein each segment may belong to one or more storylines of the television show. In the exemplary episode 10 depicted in FIG. 1, three storylines are depicted. A first storyline may comprise segments 11, 14 and 17 depicted in a tight-dot pattern. A second storyline may comprise segments 13 and 16 depicted in a cross-hatch pattern. A third storyline may comprise segment 19 depicted in a loose-dot pattern. Each of segments 12, 15 and 18, depicted in solid gray, may be considered part of multiple storylines, for example, the two storylines to which the segment is adjacent. For this exemplary episode 10, segment 12 may be part of the first storyline and the second storyline; segment 15 may be part of the first storyline and the second storyline; and segment 18 may be part of the first storyline and the third storyline. The single episode 10 may be decomposed into three storyline-based episodes 20, 22, 24 as depicted in FIGS. 2A-C. As depicted in FIG. 3, each of the multiple storylines 36, 37, 38 may be individually maintained as additional episodes 31-34 of a multi-storyline program may be recorded.

Some embodiments of the present invention may allow a viewer to selectively review the storylines of a multi-plot, continuous-story, program, such as a "soap opera," when several episodes of the program may be recorded, for example on a PVR. Currently if a viewer wishes to review a particular storyline from recorded episodes of such a program, he may fast forward through the other storylines in the process of viewing the stored episodes. Or alternatively, the viewer may visit the program's website, if it exists, and read a summary of the aired episodes. Such websites often offer storyline summaries, which may indicate that by-storyline is a desirable way to recap the previous episodes.

Figure 4:
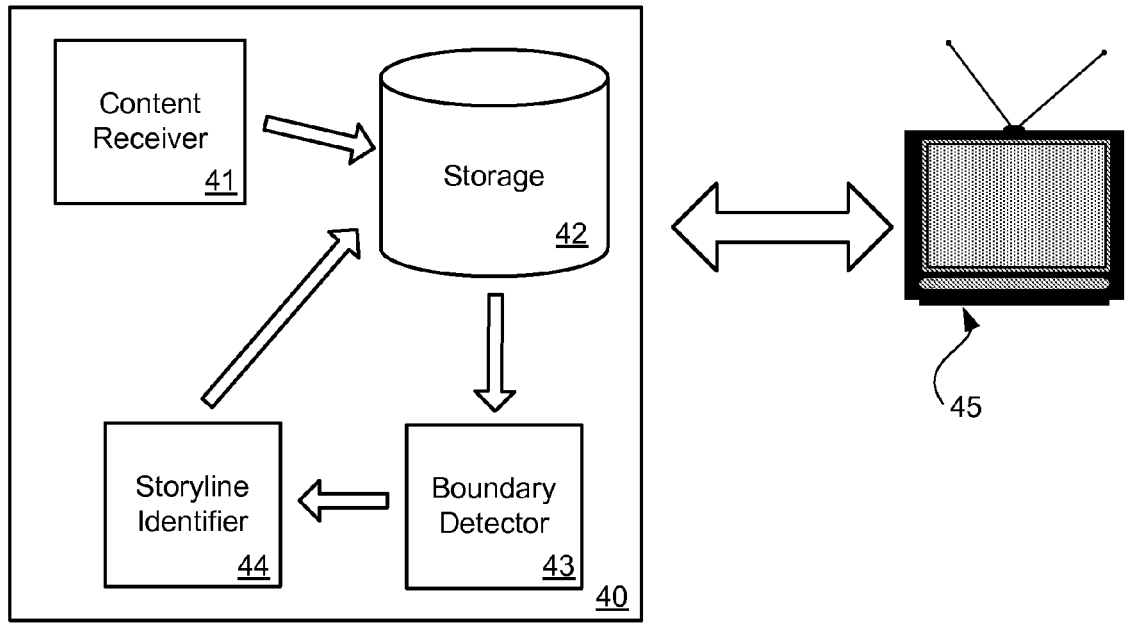
FIG. 4 is a drawing of an exemplary embodiment of the present invention comprising storyline decomposition.
Figure 5:
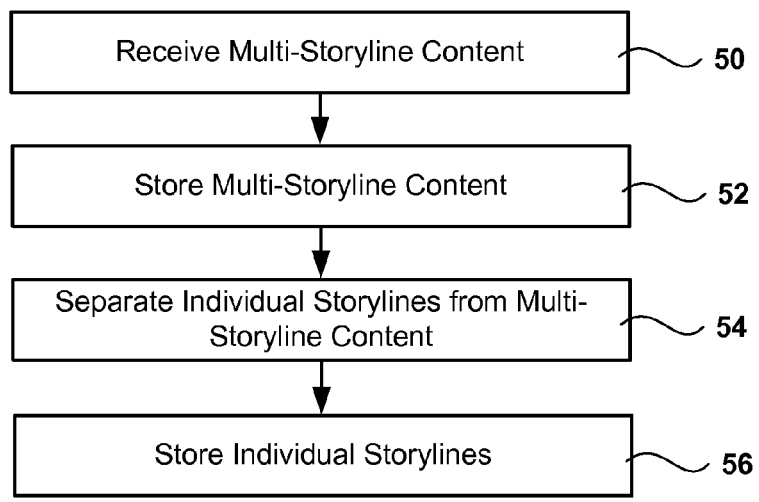
FIG. 5 is a chart showing embodiments of the present invention comprising storyline decomposition.

Some embodiments of the present invention may be described in relation to FIG. 4 and FIG. 5. These embodiments may comprise a personal, multimedia recording device 40 that may comprise a content receiver 41, content storage 42, a boundary detector 43 and a storyline identifier 44. Some embodiments may further comprise a content viewing device 45. The personal multimedia recording device 40 may receive 50 multi-storyline content. The multi-storyline content may be received 50 from sources such as a cable source, a satellite source, a VCR, a DVD and other sources. The multi-storyline content may be stored 52 in a storage medium 42 such as a hard disk drive or other medium. The storage medium 42 may be local to the device 40 in some embodiments. In alternative embodiments, the storage medium 42 may be remote to the device 40. Individual storylines may be separated 54 from the stored multi-storyline content, and individual storylines may be stored 56 on the storage medium 42. In some embodiments, the separate, individual storylines may be stored as copied segments of the original multi-storyline content. In alternative embodiments, the separate, individual storylines may be represented by a series of indices describing the segments in relation to the original content.

Figure 6:
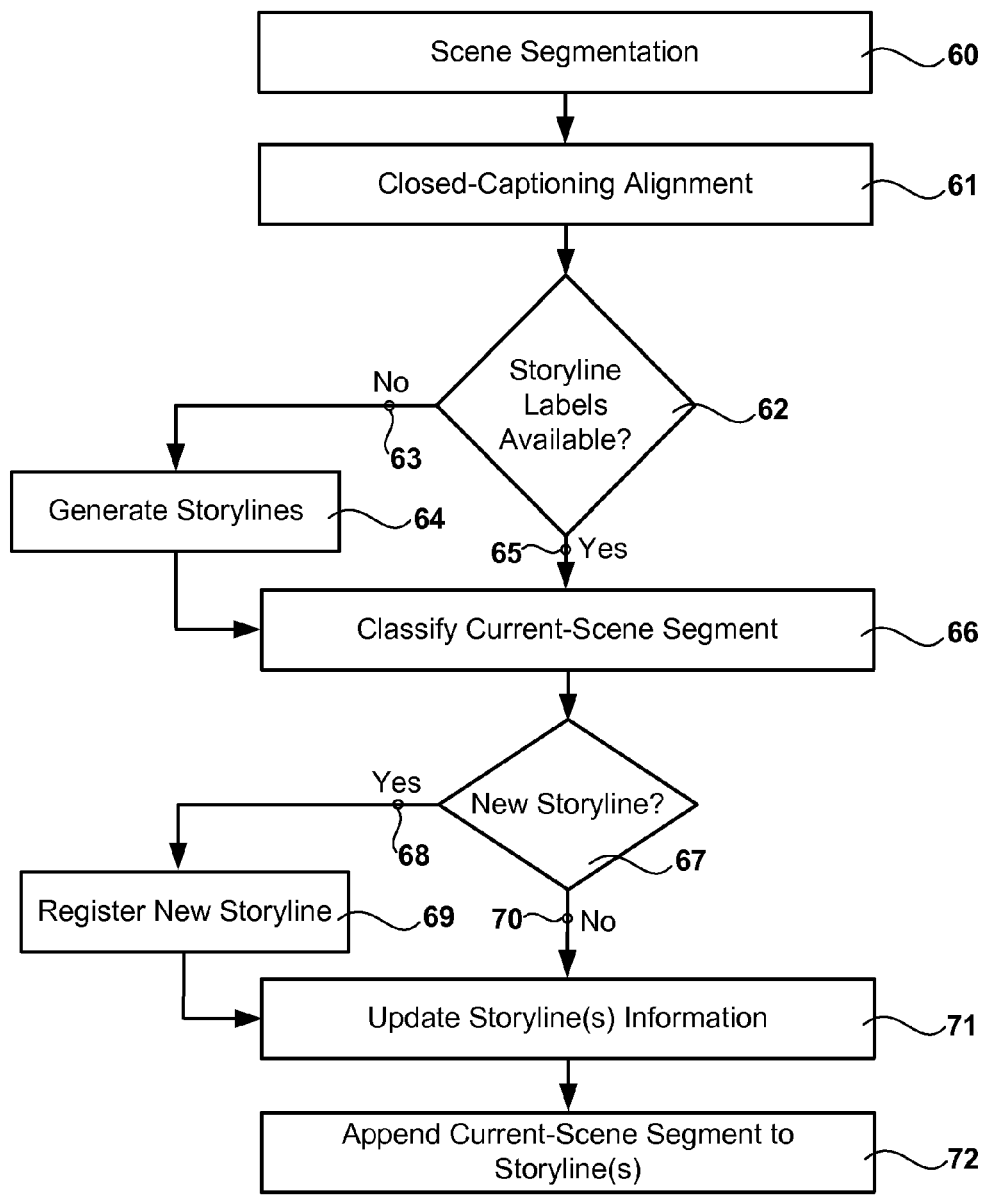
FIG. 6 is a chart showing embodiments of the present invention comprising storyline decomposition using closed-captioning data.

Some embodiments of the present invention may be described in relation to FIG. 6. In these embodiments, an episode, or other portion, of multi-storyline content may be segmented into scene segments 60, and the closed captioning may be aligned to the video 61.

Initially the individual storylines in the multi-storyline content may be identified, and described, also considered labeled, and subsequently the descriptions of individual storylines may be updated as the storylines evolve. In some embodiments, the detection of the individual storylines may occur automatically when the first episode is recorded. In alternative embodiments, the detection of the individual storylines may occur in response to receiving a request for multi-storyline decomposition. In one exemplary embodiment, a user may setup a device to record, on a daily basis, the broadcast episodes of a daytime soap opera. The user may identify at setup time, through the device user interface, that the user would like such recorded episodes to be decomposed by storyline. The request for decomposition by storyline may be stored and activated at any time after the recording of at least one episode. In an alternative exemplary embodiment, a user may indicate, through a device user interface, that the several, already stored, episodes should be decomposed by storyline, thereby generating the request for initial storyline separation.

Additionally, in some embodiments of the present invention, new storyline identifiers and descriptions may be added as new storylines emerge in recorded episodes and current storylines become dormant. It may be determined 62 if storylines have been identified and labeled for the program for which the multi-storyline content may be associated. If there are no storyline labels for the content 63, then storyline labels may be generated 64.

Scene segments may be classified 66 as to which storyline, or storylines, they belong. In some embodiments, classification 66 may comprise detection of new storylines. It may be determined 67 if the storyline classification corresponds to a new storyline. If the storyline classification is a new storyline 68, then the new storyline may be registered 69, thereby generating a storyline label and initializing 71 storyline information. If the storyline classification is an existing storyline 70, then the corresponding storyline information may be updated 71. The current-scene segment may be appended 72 to the previously identified and stored segments corresponding to the storyline for existing storylines. For newly determined storylines, the current-scene segment may be the first segment in the storyline.

The above-described processing may be performed for each scene segment, thereby decomposing the multi-storyline content into multiple, single-storyline contents. In some embodiments, a scene segment may belong to more than one storyline. In these embodiments, the scene information may be used to update the storyline information for each storyline for which the segment may be detected as belonging, and the segment may be appended to each storyline.

In some embodiments of the present invention, the multi-storyline storyline-decomposition may be based on the co-occurrence of story characters in a scene and their spoken reference to other characters. In these embodiments, storyline information may comprise the names of characters appearing in scenes belonging to the storyline and the names of the characters discussed by the appearing characters.

Figure 7:
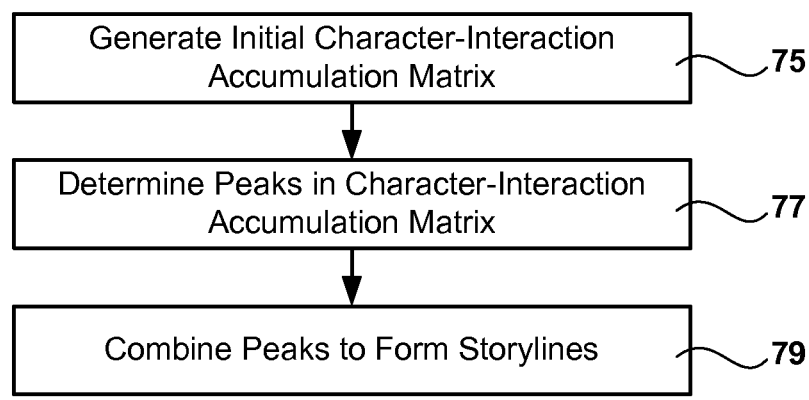
FIG. 7 is a chart showing embodiments of the present invention comprising a character-interaction accumulation matrix.

In some embodiments of the present invention, described in relation to FIG. 7, initial determination of storylines may be accomplished over time. In these embodiments, a three-dimensional accumulation matrix, A[i][j][k], may be formed 75 where i, j, and k may correspond to characters in the story. Initialized to zero, the accumulator bin A[i][j][k] may be incremented when characters i and j appear together in a scene and character k is discussed in that scene. The information captured in the matrix may be used to build and maintain a listing and description of storylines.

In some embodiments of the present invention, peaks may be determined 77 in the matrix A. Storylines may be determined based on the peaks 79 and features of the matrix A. Exemplary storyline descriptions may be:

Storyline 1: [appearing (A and C) referencing (B or (E and F))]

Storyline 2: [appearing (B and C) referencing (A)] or
[appearing (A and B) referencing (C)] or
[appearing (A and C) referencing (B)] and Storyline 3: [appearing (A and F) referencing (B or C or D)] and
[appearing (H and K) referencing (B or D)].

In some embodiments of the present invention, a recording device may present, via the user interface, a list comprising the title of the multi-storyline content and the individual, separate storylines for playback. In some embodiments of the present invention, the individual, separate storylines may be denoted by a generic label in the playback list. In alternative embodiments, the individual, separate storylines may be denoted by a user-customized label.

In some embodiments, each storyline description may carry with it side information. Exemplary side information to a storyline may comprise the percentage of scene segments which belong to the storyline, the age of the storyline, the number of other storylines with which a storyline overlaps, the percentage of time devoted to a storyline and other side information. In some embodiments of the present invention, the side information may also be used to classify a scene segment.

Figure 8:
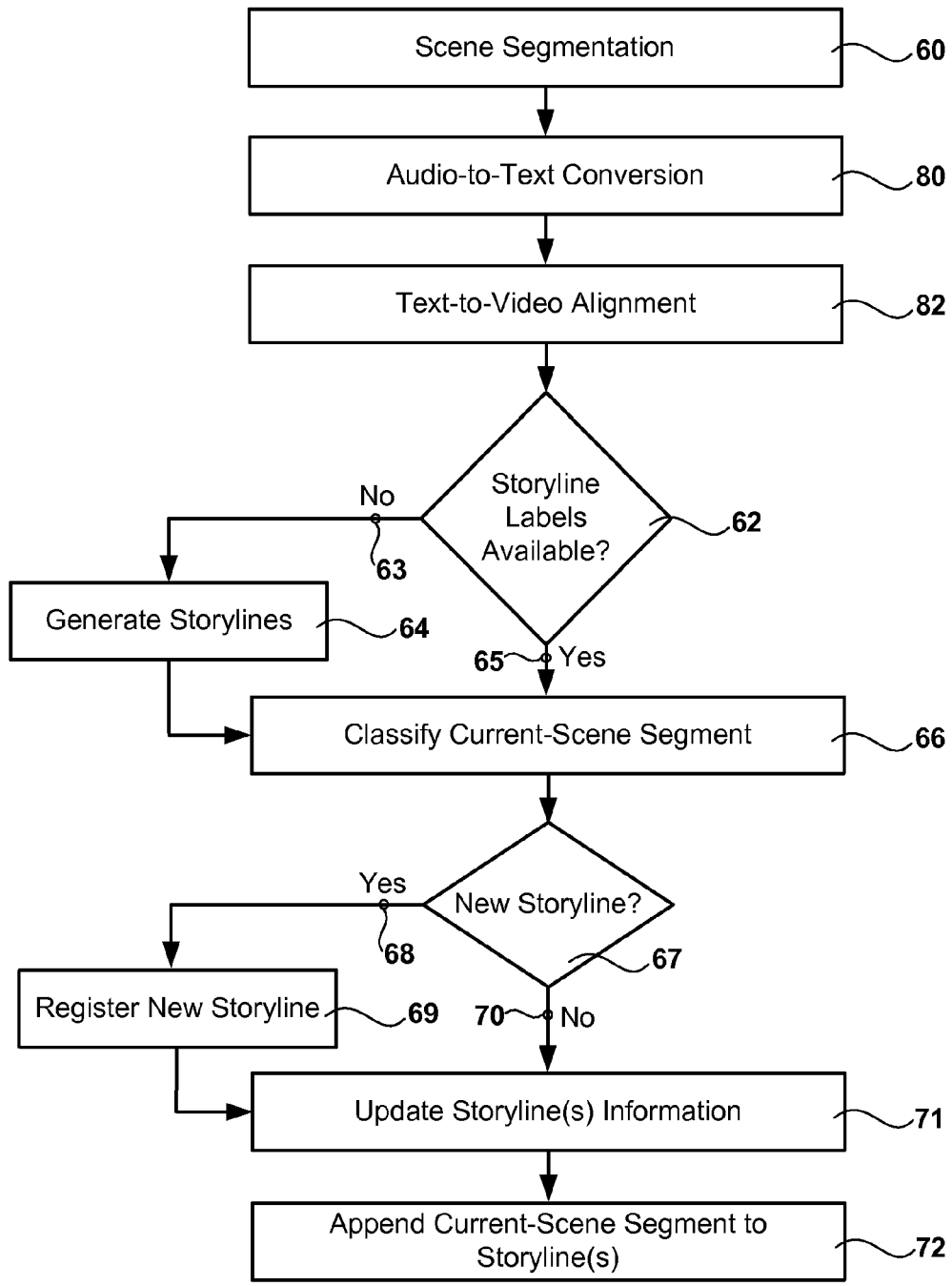
FIG. 8 is a chart showing embodiments of the present invention comprising storyline decomposition using audio-to-text conversion.

Some embodiments of the present invention may be described in relation to FIG. 8. In these embodiments, an episode, or other portion, of multi-storyline content may be segmented into scene segments 60, and the audio may be converted to text 80. The text may be then aligned to the video 82, and processing may continue as described in the above embodiments.

In alternative embodiments of the present invention, scene segmentation and storyline identification may be carried as side information in the multimedia data.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for processing multimedia data, said method comprising:
   receiving multimedia data, wherein said multimedia data comprises a plurality of storylines;
   segmenting said multimedia data into a first plurality of scenes;
   identifying said plurality of storylines, wherein said identifying is based on a co-occurrence of a first plurality of story characters in a second plurality of scenes, from said first plurality of scenes, and a spoken reference, in said second plurality of scenes, to a second plurality of story characters;
   associating each scene in said first plurality of scenes with at least one storyline in said plurality of storylines; and
   generating a by-storyline data sequence for each storyline in said plurality of storylines, wherein each of said by-storyline data sequences comprises all of said scenes, in said first plurality of scenes, associated with said storyline.

2. A method according to claim 1, wherein said multimedia data comprises a stream of at least one of video, audio and text elements.

3. A method according to claim 1, wherein said identifying said plurality of storylines comprises generating three-dimensional accumulation matrix.

4. A method according to claim 1, wherein said generating said by-storyline data sequence comprises concatenating said plurality of scenes associated with said storyline to a previously-stored data sequence corresponding to said storyline.

5. A method according to claim 1 further comprising detecting a new storyline.

6. A method according to claim 1, wherein said identifying said plurality of storylines comprises:
   determining, for each pair of story characters from a third plurality of story characters and each of said additional story characters in said third plurality of story characters, the number of scenes, in said first plurality of scenes, in which said pair of story characters appears and in which said pair of story characters refer to said additional story character, thereby producing a three-dimensional co-occurrence matrix;
   determining a plurality of peaks in said three-dimensional co-occurrence matrix; and
   identifying said plurality of storylines based on said plurality of peaks.

7. A method according to claim 6, wherein said determining, for each pair of story characters from said third plurality of characters and each of said additional story characters in said third plurality of story characters, the number of scenes, in said first plurality of scenes, in which said pair of story characters appears and in which said pair of story characters refer to said additional story character, thereby producing a three-dimensional co-occurrence matrix comprises parsing closed-captioning data associated with said multimedia data.

8. A system for processing multimedia data, said system comprising:
   a receiver for receiving multimedia data, wherein said multimedia data comprises a plurality of storylines;
   storage for said multimedia data;
   a segmentor for segmenting said multimedia data into a first plurality of scenes;
   a storyline identifier for identifying said plurality of storylines, wherein said identifying is based on a co-occurrence of a first plurality of story characters in a second plurality of scenes, from said first plurality of scenes, and a spoken reference, in said second plurality of scenes, to a second plurality of story characters;
   a storyline associator for associating each scene in said first plurality of scenes with at least one storyline in said plurality of storylines; and
   a generator for generating a by-storyline data sequence for each storyline in said plurality of storylines, wherein each of said by-storyline data sequences comprises all of said scenes, in said first plurality of scenes, associated with said storyline.

9. A system according to claim 8 further comprising a transmitter for transmitting said by-storyline data to a viewing device.

10. A system according to claim 9 wherein said viewing device is a television.

11. A system according to claim 8, wherein said multimedia data comprises a stream of at least one of video, audio and text elements.

12. A system according to claim 8, wherein said storyline identifier for identifying said plurality of storylines comprises an accumulation-matrix generator for generating a three-dimensional accumulation matrix.

13. A system according to claim 8, wherein said generator comprises a concatenator for concatenating said plurality of scenes associated with said storyline to a previously-stored data sequence corresponding to said storyline.

14. A system according to claim 8 further comprising storing said by-storyline data sequence on said storage.

15. A system according to claim 8 further comprising a new-storyline detector for detecting a new storyline.

16. A system according to claim 8, wherein said storyline identifier comprises:
   a co-occurrence generator for determining, for each pair of story characters from a third plurality of story characters and each of said additional story characters in said third plurality of story characters, the number of said scenes, in said first plurality of scenes, in which said pair of story characters appears and in which said pair of story characters refer to said additional story character, said co-occurrence generator thereby producing a three-dimensional co-occurrence matrix;
   a peak detector for determining a plurality of peaks in said three-dimensional co-occurrence matrix; and
   a peak combiner for identifying said plurality of storylines based on said plurality of peaks.

17. A system according to claim 16, wherein said co-occurrence generator comprises a parser for parsing a closed-captioning stream associated with said multimedia data.

18. A personal entertainment device, said device comprising:
   a receiver for receiving a first episode of a serial program, wherein said first episode comprises a plurality of storylines;
   a storage medium for storing said first episode;
   a storyline identifier for identifying a storyline, wherein said identifying is based on a co-occurrence of a first plurality of story characters in a first plurality of scenes and a spoken reference, in said first plurality of scenes, to a second plurality of story characters;

a storyline extractor for extracting a plurality of segments from said first episode, wherein said plurality of segments corresponds to at least one storyline in said plurality of storylines; and a storyline generator for associating said plurality of segments corresponding to said at least one storyline in said plurality of storylines with a stored version of said at least one storyline in said plurality of storylines, wherein said stored version of said at least one storyline is based on a previously received episode of said serial program.

19. A personal entertainment device according to claim 18, wherein said associating said plurality of segments corresponding to said at least one storyline in said plurality of storylines with a stored version of said at least one storyline in said plurality of storylines comprises concatenating said plurality of segments corresponding to said at least one storyline in said plurality of storylines to each of said stored versions of said at least one storylines in said plurality of storylines.

20. A personal entertainment device according to claim 18 further comprising a new storyline identifier for identifying a new storyline.

\* \* \* \* \*